(12) United States Patent
Ren et al.

(10) Patent No.: US 10,411,842 B2
(45) Date of Patent: Sep. 10, 2019

(54) DATA TRANSMISSION METHOD AND DEVICE

(71) Applicant: CHINA ACADEMY OF TELECOMMUNICATIONS TECHNOLOGY, Beijing (CN)

(72) Inventors: Bin Ren, Beijing (CN); Shaoli Kang, Beijing (CN); Fei Qin, Beijing (CN); Shaohui Sun, Beijing (CN); Qiubin Gao, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 0 days.

(21) Appl. No.: 15/744,525

(22) PCT Filed: Jul. 29, 2016

(86) PCT No.: PCT/CN2016/092345
§ 371 (c)(1),
(2) Date: Jan. 12, 2018

(87) PCT Pub. No.: WO2017/020777
PCT Pub. Date: Sep. 2, 2017

(65) Prior Publication Data
US 2018/0205506 A1     Jul. 19, 2018

(30) Foreign Application Priority Data
Aug. 6, 2015  (CN) .......................... 2015 1 0477817

(51) Int. Cl.
*H04L 5/00* (2006.01)
*H04W 72/04* (2009.01)
*H04L 25/02* (2006.01)

(52) U.S. Cl.
CPC .......... *H04L 5/0001* (2013.01); *H04L 5/0007* (2013.01); *H04L 5/0037* (2013.01);
(Continued)

(58) Field of Classification Search
CPC ..... H04L 5/0001; H04L 25/02; H04L 5/0048; H04L 5/0007; H04L 5/0037; H04W 72/044
See application file for complete search history.

(56) References Cited

U.S. PATENT DOCUMENTS 10,014,968 B2 * 7/2018 Ohwatari .............. H04W 76/27
10,193,735 B2 * 1/2019 Kwon ................... H04L 1/0001
(Continued)

FOREIGN PATENT DOCUMENTS

CN     101267239 A     9/2008
CN     102014506 A     4/2011
(Continued)

OTHER PUBLICATIONS

From EPO Application No. 16832265.9, Extended European Search Report and Search Opinion dated Jun. 15, 2018.
Kelvin Au et al., "Uplink Contention Based SCMA for 5G Radio Access"; Globecom 2014 Workshop—Emerging Technologies for 5G Wireless Cellular Networks; IEEE; Dec. 8, 2014; pp. 900-905.
(Continued)

*Primary Examiner* — Sharad Rampuria
(74) *Attorney, Agent, or Firm* — Ladas & Parry, LLP

(57) ABSTRACT

The present disclosure relates to the field of wireless communication technology, and provides a data transmission method and a data transmission device, so as to solve the problem in the related art where, for 5G application scenarios, in the case that an uplink scheduling algorithm for a conventional 4G system continues to be used, a large number of control signaling overheads are required due to the meteoric growth in the number of UEs to be connected. In the present disclosure, a network side device determines non-orthogonal multiple access basic transmission units
(Continued)

allocated to UEs, detects a pilot signal from each UE on the corresponding non-orthogonal multiple access basic transmission unit, and in the case that the pilot signal has been detected, performs data detection on the UE which has transmitted the pilot signal through the non-orthogonal multiple access basic transmission unit.

9 Claims, 4 Drawing Sheets

(52) U.S. Cl.
CPC ............ *H04L 5/0048* (2013.01); *H04L 25/02* (2013.01); *H04W 72/044* (2013.01)

(56) References Cited

U.S. PATENT DOCUMENTS

| | | | |
|---|---|---|---|
| 2014/0135025 | A1 | 5/2014 | Yoo et al. |
| 2014/0254544 | A1* | 9/2014 | Kar Kin Au ......... H04L 5/0033 370/330 |
| 2014/0362805 | A1 | 12/2014 | Nystrom et al. |
| 2016/0112995 | A1* | 4/2016 | Chen .................. H04L 27/3461 370/329 |

FOREIGN PATENT DOCUMENTS

| | | |
|---|---|---|
| CN | 103546264 A | 1/2014 |
| WO | 2014135126 A1 | 12/2014 |
| WO | 2014208158 A1 | 12/2014 |

OTHER PUBLICATIONS

Wang et al., "Comparison Study of Non-Orthogonal Multiple Access Schemes for 5G"; 2015 IEE International Symposium on Broadband Multimedia Systems and Broadcasting; Jun. 15, 2015; pp. 1-5.

International Search Report for PCT/CN2016/092345 dated Oct. 25, 2016 and its English translation provided by WIPO.

Written Opinion of the International Search Authority for PCT/CN2016/092345 dated Oct. 25, 2016 and its machine English translation provided by Google Translate.

From TW Application No. 105124390, Office Action dated Jul. 5, 2017 and its machine English translation provided by associate.

R1-153333—NTT DOCOMO, "Candidate non-orthogonal multiplexing access scheme", 3GPP TSG RAN WG1 Meeting #81 May 25-29, 2015; pp. 1-7.

Chen, Xiaohang et al., "Multi-User Proportional Fair Scheduling for Uplink Non-Orthogonal Multiple Access (NOMA)", Vehicular Technology Conference (VTC Spring), 2014 IEEE 79th, Jan. 29, 2015, pp. 1-5.

Chen, Xiaohang et al., "Evaluations of Downlink Non-Orthogonal Multiple Access (NOMA) Combined with SU-MIMO", Personal, Indoor, and Mobile Radio Communication (PIMRC), 2014 IEEE 25th Annual International Symposium on, Jun. 29, 2015, pp. 1-5.

GP-150378—Samsung, "Discussions of Non-Orthogonal Multiple Access in CIoT", 3GPP TSG GERAN #66, May 29, 2015, pp. 1-5.

RP-141936—NTT DOCOMO, Inc.; "Justification for NOMA in New Study on Enhanced Multi-User Transmission and Network Assisted Interference Cancellation for LTE", 3GPP TSG RAN Meeting #66, Dec. 11, 2014, pp. 1-7.

Notification of Reasons for Refusal from JP app. No. 2018-505638, dated Feb. 12, 2019, with machine English translation from JPO.

* cited by examiner

DATA TRANSMISSION METHOD AND DEVICE

CROSS-REFERENCE TO RELATED APPLICATION

The present application claims a priority of the Chinese patent application No. 201510477817.2 filed on Aug. 6, 2015, which is incorporated herein by reference in its entirety.

TECHNICAL FIELD

The present disclosure relates to the field of wireless communication technology, in particular to a data transmission method and a data transmission device.

BACKGROUND

Such requirements as Gbps-level transmission rate, ultra-high flux density, huge connections, increased spectral efficiency and reduced time delay have been put forward for a $5^{th}$-generation (5G) mobile communication system. An IMT-2020 (5G) promotion group in China has proposed four typical application scenarios for the 5G mobile communication system, i.e., an application scenario with wide-area coverage and an application scenario with hotspot, large-capacity coverage with respect to a mobile Internet application, and an application scenario with low-power-consumption, large connection and an application scenario with low time delay and high reliability with respect to a mobile Internet of Things (IoT) application.

Currently, the $3^{rd}$-Generation Partnership Project (3GPP) has initiated MultiUser Superposition Transmission (MUST), which mainly focuses on the application of a non-orthogonal multiple access technology to downlink transmission and the use thereof to increase the spectral efficiency. Essentially, the MUST is a mobile Internet scenario-oriented application.

A principal challenge for a 5G mobile Internet business application lies in an increase in the transmission rate, usually with large-scale antenna array, ultra-dense networking and high-frequency communication as main technical means and with the non-orthogonal multiple access technology as a strengthening way. A principal challenge for a 5G IoT business application lies in a huge number of connections.

For the 5G mobile IoT application scenarios with a large number of connections, low time delay and high reliability, in the case that an uplink scheduling algorithm for a conventional 4G system continues to be used, a large number of control signaling overheads are required. In the case that the number of the connections reaches a certain value, the number of User Equipments (UEs) scheduled by the system is limited to control channel resources.

In a word, for the 5G application scenarios, in the case that the uplink scheduling algorithm for the conventional 4G system continues to be used, a large number of control signaling overheads are required due to the meteoric growth in the number of the UEs to be connected.

SUMMARY

An object of the present disclosure is to provide a data transmission method and a data transmission device, so as to solve the problem in the related art where, for the 5G application scenarios, in the case that the uplink scheduling algorithm for the conventional 4G system continues to be used, a large number of control signaling overheads are required due to the meteoric growth in the number of the UEs to be connected.

In one aspect, the present disclosure provides in some embodiments a data transmission method, including steps of: determining, by a network side device, non-orthogonal multiple access basic transmission units allocated to UEs, each non-orthogonal multiple access basic transmission unit corresponding to a time-frequency resource, a pattern vector resource and a pilot resource; detecting, by the network side device, a pilot signal from each UE on the non-orthogonal multiple access basic transmission unit corresponding to the UE; and in the case that the pilot signal has been detected, performing, by the network side device, data detection on the UE, which has transmitted the pilot signal, through the non-orthogonal multiple access basic transmission unit.

In a possible embodiment of the present disclosure, a time-domain resource corresponding to the non-orthogonal multiple access basic transmission unit includes one or more Orthogonal Frequency Division Multiplexing (OFDM) symbols as a basic unit. A frequency-domain resource corresponding to the non-orthogonal multiple access basic transmission unit includes a group of frequency-domain subcarriers as a basic unit, and the number of subcarriers included in the group of frequency-domain subcarriers is an integral multiple of the number of rows of a non-orthogonal multiple access pattern matrix. The pattern vector resource corresponding to the non-orthogonal multiple access basic transmission unit includes one column of the non-orthogonal multiple access pattern matrix as a basic unit. The pilot resource corresponding to the non-orthogonal multiple access basic transmission unit includes one of a group of orthogonal pilot signal sets as a basic unit.

In a possible embodiment of the present disclosure, the step of determining, by the network side device, the non-orthogonal multiple access basic transmission units allocated to the UEs includes: allocating, by the network side device, the non-orthogonal multiple access basic transmission units to the UEs in accordance with the non-orthogonal multiple access pattern matrix; or determining, by the network side device, the non-orthogonal multiple access basic transmission units allocated to the UEs in accordance with UE information, the UE information about different UEs having different values; or allocating preferentially, by the network side device, the non-orthogonal multiple access basic transmission unit for a minimum number of users to each UE.

In a possible embodiment of the present disclosure, the step of allocating, by the network side device, the non-orthogonal multiple access basic transmission units to the UEs in accordance with the non-orthogonal multiple access pattern matrix includes: allocating, by the network side device, the non-orthogonal multiple access basic transmission units with pattern vectors having different diversities to the UEs in the non-orthogonal multiple access pattern matrix in accordance with distances between the UEs and the network side device. The non-orthogonal multiple access basic transmission unit with a pattern vector having a high diversity is allocated to the UE at a large distance from the network side device.

In a possible embodiment of the present disclosure, after the network side device has detected the pilot signal form each UE on the non-orthogonal multiple access basic transmission unit corresponding to the UE, the data transmission method further includes: in the case that there is a pilot signal conflict between a UE and the other UEs, scheduling, by the network side device, the UE to perform the data transmission on a reserved scheduling time-frequency resource, and notifying, through downlink signaling, a new non-orthogonal multiple access basic transmission unit allocated to the UE; or in the case that there is the pilot signal conflict between a UE and the other UEs, notifying, by the network side device, the UE that there is a multi-user pilot signal conflict through downlink signaling, so as to enable, in the case that there exists the data transmission, the UE to transmit the pilot signal and data on the corresponding non-orthogonal multiple access basic transmission unit within a subframe delayed by N subframes, where N is a positive integer.

In a possible embodiment of the present disclosure, the network side device determines whether or not there is the pilot signal conflict between the UE and the other UEs through: determining, by the network side device, whether or not a time interval for the reception of uplink data from the UE is greater than a threshold; and in the case that the time interval is greater than the threshold, determining, by the network side device, that there is the pilot signal conflict between the UE and the other UEs, and otherwise determining that there is no pilot signal conflict between the UE and the other UEs.

In a possible embodiment of the present disclosure, after the network side device has detected the pilot signal, the data transmission method further includes: performing, by the network side device, pilot channel estimation on the UE that has transmitted the pilot signal through the non-orthogonal multiple access basic transmission unit.

In another aspect, the present disclosure provides in some embodiments a data transmission method, including steps of: determining, by a UE, an allocated non-orthogonal multiple access basic transmission unit, the non-orthogonal multiple access basic transmission unit corresponding to a time-frequency resource, a pattern vector resource and a pilot resource; and in the case that uplink data needs to be transmitted, transmitting, by the UE, a pilot signal and data simultaneously on the corresponding non-orthogonal multiple access basic transmission unit to a network side device.

In a possible embodiment of the present disclosure, a time-domain resource corresponding to the non-orthogonal multiple access basic transmission unit includes one or more OFDM symbols as a basic unit. A frequency-domain resource corresponding to the non-orthogonal multiple access basic transmission unit includes a group of frequency-domain subcarriers as a basic unit, and the number of subcarriers included in the group of frequency-domain subcarriers is an integral multiple of the number of rows of a non-orthogonal multiple access pattern matrix. The pattern vector resource corresponding to the non-orthogonal multiple access basic transmission unit includes one column of the non-orthogonal multiple access pattern matrix as a basic unit. The pilot resource corresponding to the non-orthogonal multiple access basic transmission unit includes one of a group of orthogonal pilot signal sets as a basic unit.

In a possible embodiment of the present disclosure, the step of determining, by the UE, the allocated non-orthogonal multiple access basic transmission unit includes: receiving, by the UE, the corresponding non-orthogonal multiple access basic transmission unit notified by the network side device; or determining, by the UE, the allocated non-orthogonal multiple access basic transmission unit in accordance with UE information, the UE information about different UEs having different values.

In a possible embodiment of the present disclosure, subsequent to the step of transmitting, by the UE, the pilot signal and the data simultaneously on the corresponding non-orthogonal multiple access basic transmission unit to the network side device, the data transmission method further includes, after the network side device has notified the UE through downlink signaling that there is a multi-user pilot signal conflict, transmitting, by the UE, the pilot signal and the data on the corresponding non-orthogonal multiple access basic transmission unit within a subframe delayed by N subframes in the case that there exists the data transmission, where N is a positive integer.

In yet another aspect, the present disclosure provides in some embodiments a network side device for data transmission, including: a first determination module configured to determine non-orthogonal multiple access basic transmission units allocated to UEs, each non-orthogonal multiple access basic transmission unit corresponding to a time-frequency resource, a pattern vector resource and a pilot resource; a detection module configured to detect a pilot signal from each UE on the non-orthogonal multiple access basic transmission unit corresponding to the UE; and a processing module configured to, in the case that the pilot signal has been detected, perform data detection on the UE, which has transmitted the pilot signal, through the non-orthogonal multiple access basic transmission unit.

In a possible embodiment of the present disclosure, a time-domain resource corresponding to the non-orthogonal multiple access basic transmission unit includes one or more OFDM symbols as a basic unit. A frequency-domain resource corresponding to the non-orthogonal multiple access basic transmission unit includes a group of frequency-domain subcarriers as a basic unit, and the number of subcarriers included in the group of frequency-domain subcarriers is an integral multiple of the number of rows of a non-orthogonal multiple access pattern matrix. The pattern vector resource corresponding to the non-orthogonal multiple access basic transmission unit includes one column of the non-orthogonal multiple access pattern matrix as a basic unit. The pilot resource corresponding to the non-orthogonal multiple access basic transmission unit includes one of a group of orthogonal pilot signal sets as a basic unit.

In a possible embodiment of the present disclosure, the first determination module is further configured to: allocate the non-orthogonal multiple access basic transmission units to the UEs in accordance with the non-orthogonal multiple access pattern matrix; or determine the non-orthogonal multiple access basic transmission units allocated to the UEs in accordance with UE information, the UE information about different UEs having different values; or allocate preferentially the non-orthogonal multiple access basic transmission unit for a minimum number of users to each UE.

In a possible embodiment of the present disclosure, the first determination module is further configured to allocate the non-orthogonal multiple access basic transmission units with pattern vectors having different diversities to the UEs in the non-orthogonal multiple access pattern matrix in accordance with distances between the UEs and the network side device. The non-orthogonal multiple access basic transmission unit with a pattern vector having a high diversity is allocated to the UE at a large distance from the network side device.

In a possible embodiment of the present disclosure, the processing module is further configured to: in the case that there is a pilot signal conflict between a UE and the other UEs, schedule the UE to perform the data transmission on a reserved scheduling time-frequency resource, and notify, through downlink signaling, the UE to be mapped to a new non-orthogonal multiple access basic transmission unit; or in the case that there is the pilot signal conflict between a UE and the other UEs, notify the UE that there is a multi-user pilot signal conflict through downlink signaling, so as to enable, in the case that there exists the data transmission, the UE to transmit the pilot signal and data on the corresponding non-orthogonal multiple access basic transmission unit within a subframe delayed by N subframes, where N is a positive integer.

In a possible embodiment of the present disclosure, the processing module is further configured to determine whether or not there is the pilot signal conflict between the UE and the other UEs through: determining whether or not a time interval for the reception of uplink data from the UE is greater than a threshold; and in the case that the time interval is greater than the threshold, determining that there is the pilot signal conflict between the UE and the other UEs, and otherwise determining that there is no pilot signal conflict between the UE and the other UEs.

In a possible embodiment of the present disclosure, the processing module is further configured to, after the network side device has detected the pilot signal, perform pilot channel estimation on the UE that has transmitted the pilot signal through the non-orthogonal multiple access basic transmission unit.

In still yet another aspect, the present disclosure provides in some embodiments a UE for data transmission, including: a second determination module configured to determine an allocated non-orthogonal multiple access basic transmission unit, the non-orthogonal multiple access basic transmission unit corresponding to a time-frequency resource, a pattern vector resource and a pilot resource; and a transmission module configured to, in the case that uplink data needs to be transmitted, transmit a pilot signal and data simultaneously on the corresponding non-orthogonal multiple access basic transmission unit to a network side device.

In a possible embodiment of the present disclosure, a time-domain resource corresponding to the non-orthogonal multiple access basic transmission unit includes one or more OFDM symbols as a basic unit. A frequency-domain resource corresponding to the non-orthogonal multiple access basic transmission unit includes a group of frequency-domain subcarriers as a basic unit, and the number of subcarriers included in the group of frequency-domain subcarriers is an integral multiple of the number of rows of a non-orthogonal multiple access pattern matrix. The pattern vector resource corresponding to the non-orthogonal multiple access basic transmission unit includes one column of the non-orthogonal multiple access pattern matrix as a basic unit. The pilot resource corresponding to the non-orthogonal multiple access basic transmission unit includes one of a group of orthogonal pilot signal sets as a basic unit.

In a possible embodiment of the present disclosure, the second determination module is further configured to: receive the corresponding non-orthogonal multiple access basic transmission unit notified by the network side device; or determine the allocated non-orthogonal multiple access basic transmission unit in accordance with UE information. The UE information about different UEs has different values.

In a possible embodiment of the present disclosure, the transmission module is further configured to, after the network side device has notified the UE through downlink signaling that there is a multi-user pilot signal conflict, transmit the pilot signal and the data on the corresponding non-orthogonal multiple access basic transmission unit within a subframe delayed by N subframes in the case that there exists the data transmission, where N is a positive integer.

In still yet another aspect, the present disclosure provides in some embodiments a base station, including a processor, a transceiver and a memory. The processor is configured to read a program stored in the memory, so as to: determine non-orthogonal multiple access basic transmission units allocated to UEs, each non-orthogonal multiple access basic transmission unit corresponding to a time-frequency resource, a pattern vector resource and a pilot resource; detect a pilot signal from each UE on the non-orthogonal multiple access basic transmission unit corresponding to the UE; and in the case that the pilot signal has been detected, perform data detection on the UE, which has transmitted the pilot signal, through the non-orthogonal multiple access basic transmission unit. The transceiver is configured to receive and transmit data. The memory is configured to store therein data for the operation of the processor.

In still yet another aspect, the present disclosure provides in some embodiments a UE, including a processor, a transceiver and a memory. The processor is configured to read a program stored in the memory, so as to: determine an allocated non-orthogonal multiple access basic transmission unit, the non-orthogonal multiple access basic transmission unit corresponding to a time-frequency resource, a pattern vector resource and a pilot resource; and in the case that uplink data needs to be transmitted, transmit a pilot signal and data simultaneously on the corresponding non-orthogonal multiple access basic transmission unit to a network side device. The transceiver is configured to receive and transmit data. The memory is configured to store therein data for the operation of the processor.

According to the embodiments of the present disclosure, the network side device determines the non-orthogonal multiple access basic transmission units allocated to the UEs, and each non-orthogonal multiple access basic transmission unit corresponds to a time-frequency resource, a pattern vector resource and a pilot resource. Next, the network side device detects the pilot signal from each UE on the non-orthogonal multiple access basic transmission unit corresponding to the UE, and in the case that the pilot signal has been detected, performs the data detection on the UE, which has transmitted the pilot signal, through the non-orthogonal multiple access basic transmission unit. Because the network side device detects the pilot signal from the UE on the non-orthogonal multiple access basic transmission unit corresponding to the UE, it is able to transmit the data without scheduling the resources for the UE, thereby to meet the requirements on an application scenario where a large number of UEs have been connected to the network side device, and reduce the control signaling overhead.

DETAILED DESCRIPTION OF THE EMBODIMENTS

According to the embodiments of the present disclosure, a network side device determines non-orthogonal multiple access basic transmission units allocated to UEs, and each non-orthogonal multiple access basic transmission unit corresponds to a time-frequency resource, a pattern vector resource and a pilot resource. Next, the network side device detects a pilot signal from each UE on the non-orthogonal multiple access basic transmission unit corresponding to the UE, and in the case that the pilot signal has been detected, performs data detection on the UE, which has transmitted the pilot signal, through the non-orthogonal multiple access basic transmission unit. Because the network side device detects the pilot signal from the UE on the non-orthogonal multiple access basic transmission unit corresponding to the UE, it is able to transmit the data without scheduling the resources for the UE, thereby to meet the requirements on an application scenario where a large number of UEs have been connected to the network side device, and reduce the control signaling overhead.

The schemes in the embodiments of the present disclosure may be applied to a general non-orthogonal multiple access technology, e.g., a Pattern Division Multiple Access (PDMA) technology. Prior to introduction of embodiments of the present disclosure, all relevant information for PDMA will be given first.

For the PDMA technology, as a novel non-orthogonal multiple access technology, a sparse pattern matrix with different multiuser diversities and an encoding modulation joint optimization scheme are designed by use of asymmetry of multiuser channels, so as to achieve the superposition and transmission of non-orthogonal signals in multiple dimensions including a time-frequency domain, a power domain and a space domain, thereby to achieve a higher multiuser multiplexing function and acquire a diversity gain.

The PDMA technology may be applied to a mobile Internet scenario and a mobile IoT scenario in a better manner. In the mobile Internet scenario, it is able for the PDMA technology to increase the spectral efficiency and the system capacity through a multiuser scheduling mode, and in the mobile IoT scenario, it is able for the PDMA technology to increase the number of access users and the system capacity through a grant-free mode.

In the embodiments of the present disclosure, through the PDMA technology, it is able to establish a mapping relationship between the UEs and PDMA basic transmission units, so it is unnecessary to achieve the data transmission without scheduling the UE.

The present disclosure will be described hereinafter in conjunction with the drawings and embodiments.

Figure 1:
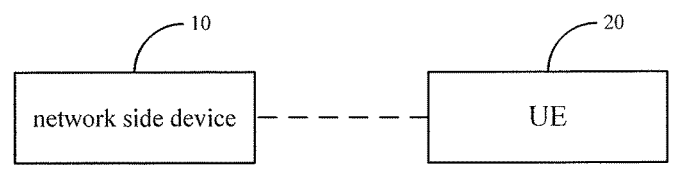
FIG. 1 is a schematic view showing a system for data transmission according to one embodiment of the present disclosure.

As shown in FIG. 1, the present disclosure provides in some embodiments a system for data transmission, which includes a network side device 10 and a UE 20.

The network side device 10 is configured to: determine non-orthogonal multiple access basic transmission units allocated to UEs, each non-orthogonal multiple access basic transmission unit corresponding to a time-frequency resource, a pattern vector resource and a pilot resource; detect a pilot signal from each UE on the non-orthogonal multiple access basic transmission unit corresponding to the UE; and in the case that the pilot signal has been detected, perform data detection on the UE, which has transmitted the pilot signal, through the non-orthogonal multiple access basic transmission unit. The UE 20 is configured to determine the allocated non-orthogonal multiple access basic transmission unit, and in the case that uplink data needs to be transmitted, transmit the pilot signal and the data simultaneously on the corresponding non-orthogonal multiple access basic transmission unit to the network side device.

In the case that no uplink data is to be transmitted, the UE 20 may not transmit any pilot signal or data on the corresponding non-orthogonal multiple access basic transmission unit.

In a possible embodiment of the present disclosure, after the network side device 10 has detected the pilot signal, the network side device 10 may perform pilot channel estimation on the UE that has transmitted the pilot signal through the non-orthogonal multiple access basic transmission unit.

During the implementation, in some embodiments of the present disclosure, the UE 20 may transmit a null pilot signal including an uplink pilot rather than any data before the data transmission. And after a certain time period, it may transmit a signal including both the uplink pilot and the data. Alternatively, the UE 20 may also transmit a null uplink pilot signal within a certain time period even in the case of no data transmission.

In some embodiments of the present disclosure, one non-orthogonal multiple access basic transmission unit may be a combination of resources such as time, frequency, pattern vector and pilot signal. A basic unit of each of the four resources may be defined as follows. A time-domain resource includes one or more OFDM symbols as a basic unit. A frequency-domain resource includes a group of frequency-domain subcarriers as a basic unit, and the number of subcarriers included in the group of frequency-domain subcarriers is an integral multiple of the number of rows of a non-orthogonal multiple access pattern matrix. A non-orthogonal multiple access pattern vector source includes a certain column of the non-orthogonal multiple access pattern matrix as a basic unit. A pilot resource includes one of a group of orthogonal pilot signal sets as a basic unit (e.g., each pilot signal set is in the form of a Code Division Multiplexing (CDM) form and corresponds to an individual cyclic shift value in a Constant Amplitude Zero Auto Correlation (CAZAC) sequence).

In a possible embodiment of the present disclosure, before the data transmission, the network side device and the UEs may predefine an uplink grant-free parameter.

The uplink grant-free parameter may include, but not limited to, parts or all of the following parameters: a system bandwidth, a ratio of grant-free time-frequency resources to granted time-frequency resources, a data format for uplink grant-free transmission, an uplink grant-free non-orthogonal multiple access basic transmission unit, and a mapping rule between the UEs and the non-orthogonal multiple access basic transmission units.

The system bandwidth is used to determine overall frequency-domain resources available for the system. The ratio of the grant-free time-frequency resources to the granted time-frequency resources is used to determine the time-frequency resources available for the granted data transmission and the grant-free data transmission respectively. The data format for the uplink grant-free transmission is used to determine an encoding modulation mode of the UE for the data in the case of the uplink/downlink grant-free data transmission.

In the embodiments of the present disclosure, the UE 20 may initiate a random access request to the network side device 10 using a known Long Term Evolution (LTE) random access procedure. Correspondingly, after the UE 20 has successfully accessed the network side device 10, the network side device 10 and the UE 20 may determine the allocated non-orthogonal multiple access basic transmission unit.

In the embodiments of the present disclosure, the non-orthogonal multiple access basic transmission unit may be determined in accordance with channel environment parameters. The channel environment parameters may include, but not limited to, parts or all of the following parameters: a path loss (PL), a position, Reference Signal Received Power (RSRP) and a Signal-to-Noise Ratio (SRN) reported by the UE during the random access procedure.

Regardless of the channel environment parameters, in some embodiments of the present disclosure, in the mapping relationship between the UEs and the non-orthogonal multiple access basic transmission units, it is necessary to ensure the pattern vectors in the allocated basic transmission unit has regular diversities, i.e., allocate the pattern vector having a high diversity to users with a well channel environment, while allocate the pattern vector having a low diversity to users with a bad channel environment.

Several schemes for determining the non-orthogonal multiple access basic transmission units are given in the embodiments of the present disclosure, and they will be described hereinafter.

In a first scheme, the network side device may allocate the non-orthogonal multiple access basic transmission unit to each UE in accordance with the non-orthogonal multiple access pattern matrix.

To be specific, the network side device may allocate the non-orthogonal multiple access basic transmission units with pattern vectors having different diversities to the UEs in the non-orthogonal multiple access pattern matrix in accordance with the channel environment parameters of the UEs and the network side device. By taking a distance parameter included in the channel environment parameters as an example, the non-orthogonal multiple access basic transmission unit with a pattern vector having a high diversity may be allocated to the UE at a large distance from the network side device. The basis for the above allocation lies in that, in the case of ensuring an identical P0 (i.e., uplink target received power), the UE far away from the network side device has a Non-Line-Of-Sight (NLOS) feature more obvious than the UE adjacent to the network side device. In other words, the farther the UE away from the network side device, the more obvious the NLOS feature, and the more probability of channel small-scale deep fading experienced by the UE due to the NLOS feature. In addition, the closer the UE to the network side device, the more obvious the Line-Of-Sight (LOS) feature, and the less probability of the channel small-scale deep fading experienced by the UE.

During the implementation, the network side device may select an appropriate non-orthogonal multiple access pattern matrix in accordance with a certain criterion. For example, the network side device may select the appropriate non-orthogonal multiple access pattern matrix in accordance with the number of UEs in a deployment scenario and a capability of a processor of the network side device, or select the appropriate non-orthogonal multiple access pattern matrix randomly.

Some examples of selecting the appropriate non-orthogonal multiple access pattern matrix in accordance with the number of the UEs in the deployment scenario and the capability of the processor of the network side device will be given as follows.

In the case that the processor of the network side device has a capability sufficient to support an overload rate of at most 400% relative to an Orthogonal Frequency Division Multiple Access (OFDMA) mode and an overload rate required for services at each UE in the deployment scenario is between 200% and 300%, the non-orthogonal multiple access pattern vector 〖4,12〗 having an overload rate of 300% may be selected. The definition of the pattern matrix may refer to an encoding matrix and a pattern mapping encoding matrix mentioned in the Chinese patent application No. 201510162290.4, which is incorporated herein by reference.

The network side device may allocate the non-orthogonal multiple access basic transmission units with pattern vectors having different diversities to the UEs in accordance with a different-diversity feature of the non-orthogonal multiple access pattern matrix and a distance between each UE and the network side device. The non-orthogonal multiple access basic transmission unit with a pattern vector having a high diversity may be allocated to the UE away from the network side device, while the non-orthogonal multiple access basic transmission unit with a pattern vector having a low diversity may be allocated to the UE adjacent to the network side device.

To be specific, the non-orthogonal multiple access pattern vectors having different diversities may be divided into different groups, and the non-orthogonal multiple access pattern vectors having an identical diversity may be grouped into an identical group. The grouped pattern vectors as well as the determined time-frequency resource and pilot resource may then be mapped together to the non-orthogonal multiple access basic transmission unit, and then the allocated non-orthogonal multiple access basic transmission unit may be notified to the UE.

The reason of grouping the pattern vectors in accordance with the diversities lies in the different distribution of the UEs managed by an identical base station and the different uplink channel conditions between the UEs and the base station. Hence, the UEs having a substantially identical channel condition may be grouped into a pattern vector group having an identical diversity.

In the first scheme, after the network side device has determined the allocated non-orthogonal multiple access basic transmission units for the UEs, the network side device may notify the mapping relationship between the UEs and the non-orthogonal multiple access basic transmission units to the UEs. Correspondingly, each UE may determine the allocated non-orthogonal multiple access basic transmission unit in accordance with a notification from the network side device.

In a second scheme, the network side device may determine the allocation non-orthogonal multiple access basic transmission unit for each UE in accordance with UE information, and the UE information for the UEs has different values.

In the case that each UE has accessed to the network side device, the network side device may not allocate an explicit resource to the UE. Each UE may be mapped to the corresponding non-orthogonal multiple access basic transmission unit using a certain rule in accordance with its specific user feature (e.g., a physical identity (ID)), and each UE may correspond to merely one non-orthogonal multiple access basic transmission unit.

For example, a modulo operation may be performed on the physical ID of each UE and the number of the non-orthogonal multiple access basic transmission units, i.e., a serial number of the non-orthogonal multiple access basic transmission unit=the physical ID of the UE mod the total number of the non-orthogonal multiple access basic transmission units. In the case that the serial number of the non-orthogonal multiple access basic transmission unit is already known, it is able to accurately position the corresponding non-orthogonal multiple access basic transmission unit.

Of course, during the implementation, after the network side device has determined the allocated non-orthogonal multiple access basic transmission unit for the UE in accordance with the UE information, the network side device may notify the allocated non-orthogonal multiple access basic transmission unit to the UE, i.e., it is unnecessary for the UE to determine the non-orthogonal multiple access basic transmission unit by itself.

In a third scheme, the network side device may preferentially allocate the non-orthogonal multiple access basic transmission unit for a minimum number of users to each UE.

To be specific, the network side device may count, in a traversing mode, the number of the UEs carried by the available non-orthogonal multiple access basic transmission units, and preferentially map each UE to the non-orthogonal multiple access basic transmission unit for a minimum number of users for each UE.

In the third scheme, after the network side device has determined the non-orthogonal multiple access basic transmission units allocated to the UEs, the network side device may notify the mapping relationship between the UEs and the non-orthogonal multiple access basic transmission units to the UEs. Correspondingly, each UE may determine the allocated non-orthogonal multiple access basic transmission unit in accordance with a notification from the network side device.

During the implementation, each UE may transmit simultaneously the pilot signal and the data to the network side device on the corresponding non-orthogonal multiple access basic transmission unit. Correspondingly, the network side device may monitor in real time the pilot signal from each UE on the corresponding non-orthogonal multiple access basic transmission unit, determine whether or not the data is transmission from the UE, and perform the data detection on the UE which has transmitted the data.

Here, a time granularity for the so-called "simultaneously" refers to a time granularity of a non-orthogonal multiple access basic resource unit (a Physical Resource Block (PRB) pair), i.e., subframe. In other words, the pilot signal and the data are transmitted to the network side device within one subframe.

In a possible embodiment of the present disclosure, in the case of performing the data detection, the network side device may further determine whether or not there is a pilot signal conflict between a UE and the other UEs.

To be specific, the network side device may determine whether or not a time interval for the reception of uplink data from the UE is greater than a threshold. In the case that the time interval is greater than the threshold, the network side device may determine that there is the pilot signal conflict between the UE and the other UEs, and otherwise it may determine that there is no pilot signal conflict between the UE and the other UEs.

During the implementation, in the case that there is the pilot signal conflict between the UE and the other UEs, there exist several processing modes, some of which will be described hereinafter.

Mode 1: Allocation of a New Non-Orthogonal Multiple Access Basic Transmission Unit to the UE To be specific, in the case that there is the pilot signal conflict between the UE and the other UEs, the network side device may schedule the UE to transmit the data on a reserved scheduling time-frequency resource, and notify, through downlink signaling, the UE to be mapped to a new non-orthogonal multiple access basic transmission unit. Correspondingly, the UE may transmit simultaneously the pilot signal and the data to the network side device through the new non-orthogonal multiple access basic transmission unit.

Mode 2: Delayed Transmission

To be specific, in the case that there is the pilot signal conflict between the UE and the other UEs, the network side device may notify, through downlink signaling, the UE that there exists a multiuser pilot signal conflict. Correspondingly, after receiving a notification from the network side device, the UE may transmit, in the case that there exists the data transmission, the pilot signal and the data on the corresponding non-orthogonal multiple access basic transmission unit within a subframe delayed by N subframes, where N is a positive integer.

During the implementation, a value of N may be set in a protocol, or determined by the network side device and the UEs through negotiation, or determined by a high layer of a network.

In the embodiments of the present disclosure, the network side device may be a base station (e.g., a macro base station or a femtocell), a Relay Node (RN) device, or any other network side devices.

Figure 4:
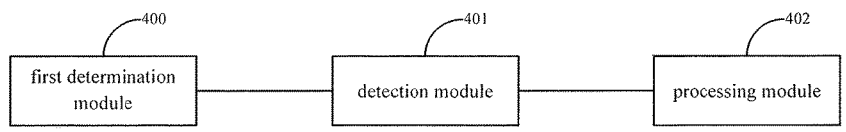
FIG. 4 is a schematic view showing a network side device according to one embodiment of the present disclosure.

As shown in FIG. 4, the present disclosure further provides in some embodiments a network side device, which includes: a first determination module 400 configured to determine a mapping relationship between UEs and non-orthogonal multiple access basic transmission units, each non-orthogonal multiple access basic transmission unit corresponding to a time-frequency resource, a pattern vector resource and a pilot resource; a detection module 401 configured to detect a pilot signal from each UE on the non-orthogonal multiple access basic transmission unit corresponding to the UE; and a processing module 402 configured to, in the case that the pilot signal has been detected, perform data detection on the UE, which has transmitted the pilot signal, through the non-orthogonal multiple access basic transmission unit.

In a possible embodiment of the present disclosure, a time-domain resource corresponding to the non-orthogonal multiple access basic transmission unit includes one or more OFDM symbols as a basic unit. A frequency-domain resource corresponding to the non-orthogonal multiple access basic transmission unit includes a group of frequency-domain subcarriers as a basic unit, and the number of subcarriers included in the group of frequency-domain subcarriers is an integral multiple of the number of rows of a non-orthogonal multiple access pattern matrix. The pattern vector resource corresponding to the non-orthogonal multiple access basic transmission unit includes one column of the non-orthogonal multiple access pattern matrix as a basic unit. The pilot resource corresponding to the non-orthogonal multiple access basic transmission unit includes one of a group of orthogonal pilot signal sets as a basic unit.

In a possible embodiment of the present disclosure, with respect to the mapping relationship between UEs and non-orthogonal multiple access basic transmission units, the UE far away from the network side device has an NLOS feature more obvious than the UE adjacent to the network side device.

In a possible embodiment of the present disclosure, the first determination module 400 is further configured to: allocate the non-orthogonal multiple access basic transmission units to the UEs in accordance with the non-orthogonal multiple access pattern matrix; or determine the non-orthogonal multiple access basic transmission units allocated to the UEs in accordance with UE information, the UE information about different UEs having different values; or allocate preferentially the non-orthogonal multiple access basic transmission unit for a minimum number of users to each UE.

In a possible embodiment of the present disclosure, the first determination module 400 is further configured to allocate the non-orthogonal multiple access basic transmission units with pattern vectors having different diversities to the UEs in the non-orthogonal multiple access pattern matrix in accordance with distances between the UEs and the network side device. The non-orthogonal multiple access basic transmission unit with a pattern vector having a high diversity is allocated to the UE at a large distance from the network side device.

In a possible embodiment of the present disclosure, the first determination module 400 is further configured to notify the corresponding non-orthogonal multiple access basic transmission unit to each UE.

In a possible embodiment of the present disclosure, the processing module 402 is further configured to: in the case that there is a pilot signal conflict between a UE and the other UEs, schedule the UE to perform the data transmission on a reserved scheduling time-frequency resource, and notify, through downlink signaling, the UE to be mapped to a new non-orthogonal multiple access basic transmission unit; or in the case that there is the pilot signal conflict between a UE and the other UEs, notify the UE that there is a multi-user pilot signal conflict through downlink signaling, so as to enable, in the case that there exists the data transmission, the UE to transmit the pilot signal and data on the corresponding non-orthogonal multiple access basic transmission unit within a subframe delayed by N subframes, where N is a positive integer.

In a possible embodiment of the present disclosure, the processing module 402 is further configured to determine whether or not there is the pilot signal conflict between the UE and the other UEs through: determining whether or not a time interval for the reception of uplink data from the UE is greater than a threshold; and in the case that the time interval is greater than the threshold, determining that there is the pilot signal conflict between the UE and the other UEs, and otherwise determining that there is no pilot signal conflict between the UE and the other UEs.

In a possible embodiment of the present disclosure, the processing module 402 is further configured to: after the network side device has detected the pilot signal, perform pilot channel estimation on the UE that has transmitted the pilot signal through the non-orthogonal multiple access basic transmission unit.

Figure 5:
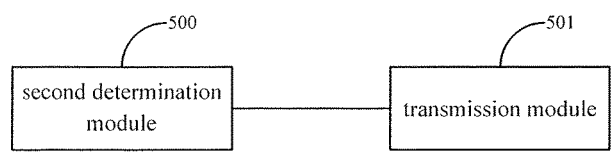
FIG. 5 is a schematic view showing a UE according to one embodiment of the present disclosure.

As shown in FIG. 5, the present disclosure further provides in some embodiments a UE, which includes: a second determination module 500 configured to determine an allocated non-orthogonal multiple access basic transmission unit, the non-orthogonal multiple access basic transmission unit corresponding to a time-frequency resource, a pattern vector resource and a pilot resource; and a transmission module 501 configured to, in the case that uplink data needs to be transmitted, transmit a pilot signal and data simultaneously on the corresponding non-orthogonal multiple access basic transmission unit to a network side device.

In a possible embodiment of the present disclosure, the transmission module 501 is further configured to, in the case that no uplink data needs to be transmitted, not transmit the pilot signal and the data on the corresponding non-orthogonal multiple access basic transmission unit.

In a possible embodiment of the present disclosure, a time-domain resource corresponding to the non-orthogonal multiple access basic transmission unit includes one or more OFDM symbols as a basic unit. A frequency-domain resource corresponding to the non-orthogonal multiple access basic transmission unit includes a group of frequency-domain subcarriers as a basic unit, and the number of subcarriers included in the group of frequency-domain subcarriers is an integral multiple of the number of rows of a non-orthogonal multiple access pattern matrix. The pattern vector resource corresponding to the non-orthogonal multiple access basic transmission unit includes one column of the non-orthogonal multiple access pattern matrix as a basic unit. The pilot resource corresponding to the non-orthogonal multiple access basic transmission unit includes one of a group of orthogonal pilot signal sets as a basic unit.

In a possible embodiment of the present disclosure, with respect to the mapping relationship between the UEs and the non-orthogonal multiple access basic transmission units, the UE away from the network side device has an NLOS feature more obvious than the UE adjacent to the network side device.

In a possible embodiment of the present disclosure, the second determination module 500 is further configured to: receive the corresponding non-orthogonal multiple access basic transmission unit notified by the network side device; or determine the allocated non-orthogonal multiple access basic transmission unit in accordance with UE information. The UE information about different UEs has different values.

In a possible embodiment of the present disclosure, the transmission module 501 is further configured to, after the network side device has notified the UE through downlink signaling that there is a multi-user pilot signal conflict, transmit the pilot signal and the data on the corresponding non-orthogonal multiple access basic transmission unit within a subframe delayed by N subframes in the case that there exists the data transmission, where N is a positive integer.

Figure 6:
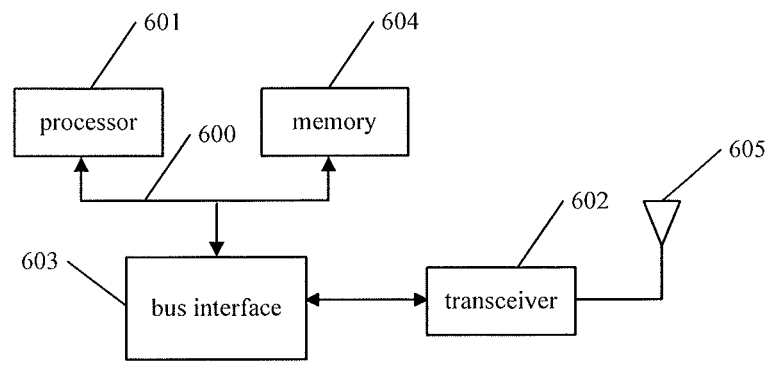
FIG. 6 is another schematic view showing the network side, device according to one embodiment of the present disclosure.

As shown in FIG. 6, the present disclosure further provides in some embodiments another network side device, which includes a processor 601, a memory 604 and a transceiver 602. The processor 601 is configured to read a program stored in a memory 604, so as to: determine non-orthogonal multiple access basic transmission units allocated to UEs, each non-orthogonal multiple access basic transmission unit corresponding to a time-frequency resource, a pattern vector resource and a pilot resource; detect a pilot signal from each UE on the non-orthogonal multiple access basic transmission unit corresponding to the UE; and in the case that the pilot signal has been detected, perform, through the transceiver 602, data detection on the UE, which has transmitted the pilot signal, through the non-orthogonal multiple access basic transmission unit. The transceiver 602 is configured to receive and transmit data under the control of the processor 601.

In a possible embodiment of the present disclosure, a time-domain resource corresponding to the non-orthogonal multiple access basic transmission unit includes one or more OFDM symbols as a basic unit. A frequency-domain resource corresponding to the non-orthogonal multiple access basic transmission unit includes a group of frequency-domain subcarriers as a basic unit, and the number of subcarriers included in the group of frequency-domain subcarriers is an integral multiple of the number of rows of a non-orthogonal multiple access pattern matrix. The pattern vector resource corresponding to the non-orthogonal multiple access basic transmission unit includes one column of the non-orthogonal multiple access pattern matrix as a basic unit. The pilot resource corresponding to the non-orthogonal multiple access basic transmission unit includes one of a group of orthogonal pilot signal sets as a basic unit.

In a possible embodiment of the present disclosure, with respect to the mapping relationship between the UEs and the non-orthogonal multiple access basic transmission units, the UE away from the network side device has an NLOS feature more obvious than the UE adjacent to the network side device.

In a possible embodiment of the present disclosure, the processor 601 is further configured to: allocate the non-orthogonal multiple access basic transmission units to the UEs in accordance with the non-orthogonal multiple access pattern matrix; or determine the non-orthogonal multiple access basic transmission units allocated to the UEs in accordance with UE information, the UE information about different UEs having different values; or allocate preferentially the non-orthogonal multiple access basic transmission unit for a minimum number of users to each UE.

In a possible embodiment of the present disclosure, the processor 601 is further configured to allocate the non-orthogonal multiple access basic transmission units with pattern vectors having different diversities to the UEs in the non-orthogonal multiple access pattern matrix in accordance with distances between the UEs and the network side device. The non-orthogonal multiple access basic transmission unit with a pattern vector having a high diversity is allocated to the UE at a large distance from the network side device.

In a possible embodiment of the present disclosure, the processor 601 is further configured to notify the corresponding non-orthogonal multiple access basic transmission unit to each UE.

In a possible embodiment of the present disclosure, the processor 601 is further configured to: in the case that there is a pilot signal conflict between a UE and the other UEs, schedule the UE to perform the data transmission on a reserved scheduling time-frequency resource, and notify, through downlink signaling, the UE to be mapped to a new non-orthogonal multiple access basic transmission unit; or in the case that there is the pilot signal conflict between a UE and the other UEs, notify the UE that there is a multi-user pilot signal conflict through downlink signaling, so as to enable, in the case that there exists the data transmission, the UE to transmit the pilot signal and data on the corresponding non-orthogonal multiple access basic transmission unit within a subframe delayed by N subframes, where N is a positive integer.

In a possible embodiment of the present disclosure, the processor 601 is further configured to determine whether or not there is the pilot signal conflict between the UE and the other UEs through: determining whether or not a time interval for the reception of uplink data from the UE is greater than a threshold; and in the case that the time interval is greater than the threshold, determining that there is the pilot signal conflict between the UE and the other UEs, and otherwise determining that there is no pilot signal conflict between the UE and the other UEs.

In a possible embodiment of the present disclosure, the processor 601 is further configured to, after the network side device has detected the pilot signal, perform pilot channel estimation on the UE that has transmitted the pilot signal through the non-orthogonal multiple access basic transmission unit.

In FIG. 6, bus architecture 600 may include a number of buses and bridges connected to each other, so as to connect various circuits for one or more processors 601 and one or more memories 604. In addition, as is known in the art, the bus architecture 600 may be used to connect any other circuits, such as a circuit for a peripheral device, a circuit for a voltage stabilizer and a power management circuit, which are not particularly defined herein. Bus interfaces 603 are provided between the bus architecture 600 and the transceiver 602, and the transceiver 602 may consist of one element, or more than one elements, e.g., transmitters and receivers for communication with any other devices over a transmission medium. Data from the processor 601 may be transmitted on a wireless medium through an antenna 605. Further, the antenna 605 may be further configured to receive data and transmit the data to the processor 601. The processor 601 may take charge of managing the bus architecture as well as general processings, and may further provide various functions such as timing, peripheral interfacing, voltage adjustment, power source management and any other control functions. The memory 604 may store therein data for the operation of the processor 601.

In a possible embodiment of the present disclosure, the processor 601 may be a Central Processing Unit (CPU), an Application Specific Integrated Circuit (ASIC), a Field-Programmable Gate Array (FPGA) or a Complex Programmable Logic Device (CPLD).

Figure 7:
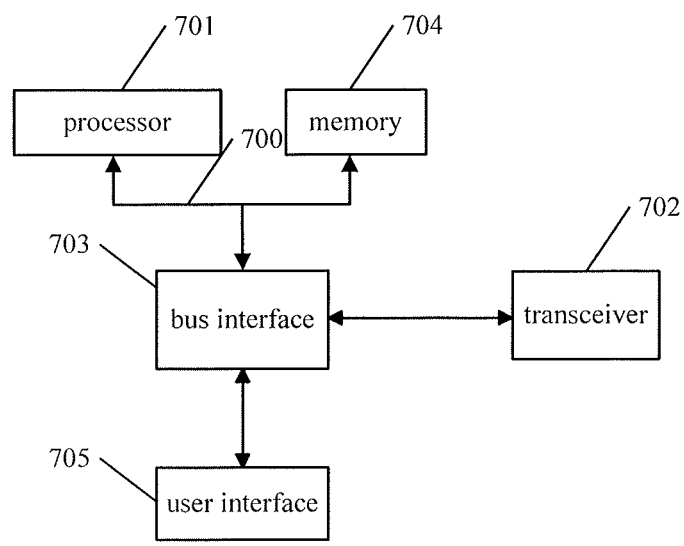
FIG. 7 is another schematic view showing the UE according to one embodiment of the present disclosure.

As shown in FIG. 7, the present disclosure further provides in some embodiments a UE, which includes a processor 701, a memory 704 and a transceiver 702. The processor 701 is configured to read programs stored in the memory 704, so as to: determine an allocated non-orthogonal multiple access basic transmission unit, the non-orthogonal multiple access basic transmission unit corresponding to a time-frequency resource, a pattern vector resource and a pilot resource; and in the case that uplink data needs to be transmitted, transmit, through the transceiver 702, a pilot signal and data simultaneously on the corresponding non-orthogonal multiple access basic transmission unit to a network side device. The transceiver 702 is configured to receive and transmit data under the control of the processor 701.

In a possible embodiment of the present disclosure, the processor 701 is further configured to, in the case that no uplink data needs to be transmitted, not transmit the pilot signal and the data on the corresponding non-orthogonal multiple access basic transmission unit.

In a possible embodiment of the present disclosure, a time-domain resource corresponding to the non-orthogonal multiple access basic transmission unit includes one or more OFDM symbols as a basic unit. A frequency-domain resource corresponding to the non-orthogonal multiple access basic transmission unit includes a group of frequency-domain subcarriers as a basic unit, and the number of subcarriers included in the group of frequency-domain subcarriers is an integral multiple of the number of rows of a non-orthogonal multiple access pattern matrix. The pattern vector resource corresponding to the non-orthogonal multiple access basic transmission unit includes one column of the non-orthogonal multiple access pattern matrix as a basic unit. The pilot resource corresponding to the non-orthogonal multiple access basic transmission unit includes one of a group of orthogonal pilot signal sets as a basic unit.

In a possible embodiment of the present disclosure, with respect to the mapping relationship between the UEs and the non-orthogonal multiple access basic transmission units, the UE away from the network side device has an NLOS feature more obvious than the UE adjacent to the network side device.

In a possible embodiment of the present disclosure, the processor 701 is further configured to: receive the corresponding non-orthogonal multiple access basic transmission unit notified by the network side device; or determine the allocated non-orthogonal multiple access basic transmission unit in accordance with UE information. The UE information about different UEs has different values.

In a possible embodiment of the present disclosure, the processor 701 is further configured to, after the network side device has notified the UE through downlink signaling that there is a multi-user pilot signal conflict, transmit the pilot signal and the data on the corresponding non-orthogonal multiple access basic transmission unit within a subframe delayed by N subframes in the case that there exists the data transmission, where N is a positive integer.

In FIG. 7, bus architecture 700 may include a number of buses and bridges connected to each other, so as to connect various circuits for one or more processors 701 and one or more memories 704. In addition, as is known in the art, the bus architecture 700 may be used to connect any other circuits, such as a circuit for a peripheral device, a circuit for a voltage stabilizer and a power management circuit. Bus interfaces 703 are provided between the bus architecture 700 and the transceiver 702. And the transceiver 702 may consist of a plurality of elements, i.e., a transmitter and a receiver for communication with any other devices over a transmission medium, e.g., the transceiver 702 may receive data from the other devices, and transmit the data processed by the processor 701 to the other devices. Depending on properties of a computer system, user interfaces 705 may also be provided, such as a keypad, a display, a speaker, a microphone and a joystick. The processor 701 may take charge of managing the bus architecture 700 as well general processings, e.g., running a general-purpose operating system. The memory 704 may store data therein for the operation of the processor 701.

In a possible embodiment of the present disclosure, the processor 701 may be a CPU, an ASIC, an FPGA or a CPLD.

Based on an identical inventive concept, the present disclosure further provides in some embodiments a data transmission method implemented by the above-mentioned network side device in the system for data transmission. A principle of the method for solving the technical problem is identical to that of the network side device, and the implementation of the method may refer to that of the network side device, which will thus not be particularly defined herein.

Figure 8:
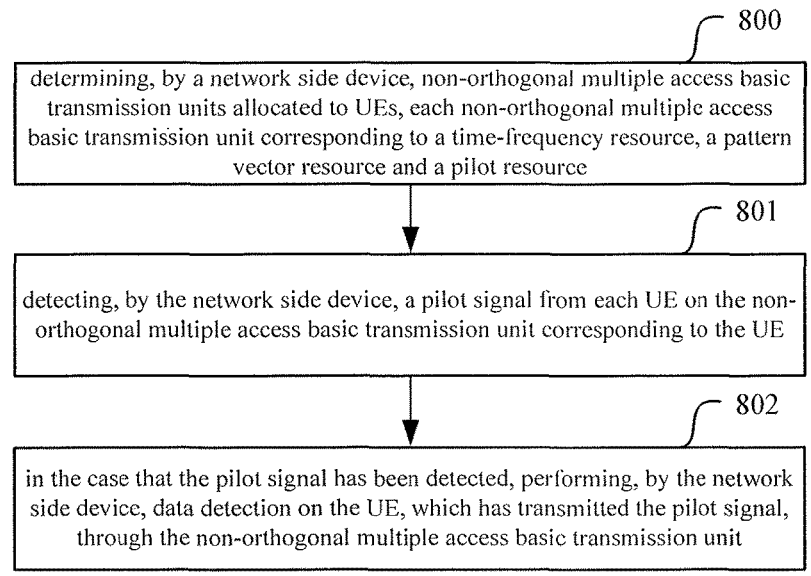
FIG. 8 is a flow chart of a data transmission method according to one embodiment of the present disclosure.

As shown in FIG. 8, the present disclosure provides in some embodiments a data transmission method, which includes: Step 800 of determining, by a network side device, a mapping relationship between UEs and non-orthogonal multiple access basic transmission units, each non-orthogonal multiple access basic transmission unit corresponding to a time-frequency resource, a pattern vector resource and a pilot resource; Step 801 of detecting, by the network side device, a pilot signal from each UE on the non-orthogonal multiple access basic transmission unit corresponding to the UE; and Step 802 of, in the case that the pilot signal has been detected, performing, by the network side device, data detection on the UE, which has transmitted the pilot signal, through the non-orthogonal multiple access basic transmission unit.

In a possible embodiment of the present disclosure, after the network side device has detected the pilot signal, the data transmission method may further include performing pilot channel estimation on the UE which has transmitted the pilot signal through the non-orthogonal multiple access basic transmission unit.

In a possible embodiment of the present disclosure, a time-domain resource corresponding to the non-orthogonal multiple access basic transmission unit includes one or more OFDM symbols as a basic unit. A frequency-domain resource corresponding to the non-orthogonal multiple access basic transmission unit includes a group of frequency-domain subcarriers as a basic unit, and the number of subcarriers included in the group of frequency-domain subcarriers is an integral multiple of the number of rows of a non-orthogonal multiple access pattern matrix. The pattern vector resource corresponding to the non-orthogonal multiple access basic transmission unit includes one column of the non-orthogonal multiple access pattern matrix as a basic unit. The pilot resource corresponding to the non-orthogonal multiple access basic transmission unit includes one of a group of orthogonal pilot signal sets as a basic unit.

In a possible embodiment of the present disclosure, with respect to the mapping relationship between the UEs and the non-orthogonal multiple access basic transmission units, the UE away from the network side device has an NLOS feature more obvious than the UE adjacent to the network side device.

In a possible embodiment of the present disclosure, the step of determining, by the network side device, the non-orthogonal multiple access basic transmission units allocated to the UEs includes: allocating, by the network side device, the non-orthogonal multiple access basic transmission units to the UEs in accordance with the non-orthogonal multiple access pattern matrix; or determining, by the network side device, the non-orthogonal multiple access basic transmission units allocated to the UEs in accordance with UE information, the UE information about different UEs having different values; or allocating preferentially, by the network side device, the non-orthogonal multiple access basic transmission unit for a minimum number of users to each UE.

In a possible embodiment of the present disclosure, the step of allocating, by the network side device, the non-orthogonal multiple access basic transmission units to the UEs in accordance with the non-orthogonal multiple access pattern matrix includes allocating, by the network side device, the non-orthogonal multiple access basic transmission units with pattern vectors having different diversities to the UEs in the non-orthogonal multiple access pattern matrix in accordance with distances between the UEs and the network side device. The non-orthogonal multiple access basic transmission unit with a pattern vector having a high diversity is allocated to the UE at a large distance from the network side device.

In a possible embodiment of the present disclosure, subsequent to the step of allocating, by the network side device, the non-orthogonal multiple access basic transmission unit to each UE in accordance with the non-orthogonal multiple access pattern matrix, the data transmission method further includes notifying, by the network side device, the corresponding non-orthogonal multiple access basic transmission unit to the UE.

In a possible embodiment of the present disclosure, after the network side device has detected the pilot signal form each UE on the non-orthogonal multiple access basic transmission unit corresponding to the UE, the data transmission method further includes: in the case that there is a pilot signal conflict between a UE and the other UEs, scheduling, by the network side device, the UE to perform the data transmission on a reserved scheduling time-frequency resource, and notifying, through downlink signaling, a new non-orthogonal multiple access basic transmission unit allocated to the UE; or in the case that there is the pilot signal conflict between a UE and the other UEs, notifying, by the network side device, the UE that there is a multi-user pilot signal conflict through downlink signaling, so as to enable, in the case that there exists the data transmission, the UE to transmit the pilot signal and data on the corresponding non-orthogonal multiple access basic transmission unit within a subframe delayed by N subframes, where N is a positive integer.

In a possible embodiment of the present disclosure, the network side device determines whether or not there is the pilot signal conflict between the UE and the other UEs through: determining, by the network side device, whether or not a time interval for the reception of uplink data from the UE is greater than a threshold; and in the case that the time interval is greater than the threshold, determining, by the network side device, that there is the pilot signal conflict between the UE and the other UEs, and otherwise determining that there is no pilot signal conflict between the UE and the other UEs.

Based on an identical inventive concept, the present disclosure further provides in some embodiments a data transmission method implemented by the above-mentioned UE in the system for data transmission. A principle of the method for solving the technical problem is identical to that of the UE, and the implementation of the method may refer to that of the UE, which will thus not be particularly defined herein.

Figure 9:
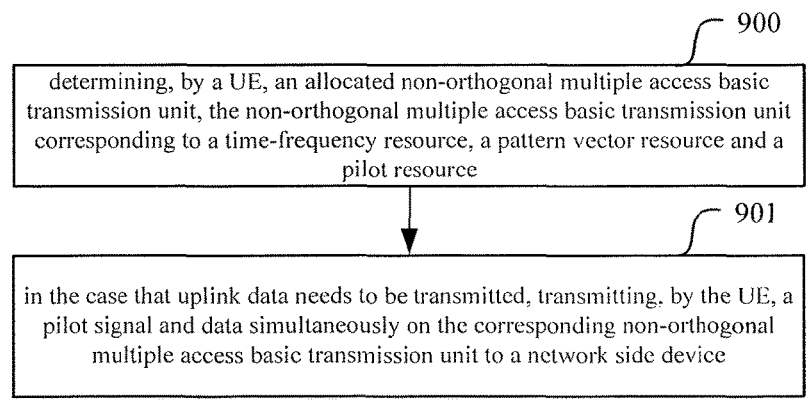
FIG. 9 is a flow chart of another data transmission method according to one embodiment of the present disclosure.

As shown in FIG. 9, the present disclosure provides in some embodiments another data transmission method, which includes: Step 900 of determining, by a UE, an allocated non-orthogonal multiple access basic transmission unit, the non-orthogonal multiple access basic transmission unit corresponding to a time-frequency resource, a pattern vector resource and a pilot resource; and Step 901 of, in the case that uplink data needs to be transmitted, transmitting, by the UE, a pilot signal and data simultaneously on the corresponding non-orthogonal multiple access basic transmission unit to a network side device.

In a possible embodiment of the present disclosure, in the case that no uplink data needs to be transmitted, the UE may transmit no pilot signal or data on the corresponding non-orthogonal multiple access basic transmission unit.

During the implementation, in some embodiments of the present disclosure, the UE may transmit a null pilot signal including an uplink pilot rather than any data before the data transmission, and after a certain time period, it may transmit a signal including both the uplink pilot and the data. Alternatively, the UE may also transmit a null uplink pilot signal within a certain time period even in the case of no data transmission.

In a possible embodiment of the present disclosure, a time-domain resource corresponding to the non-orthogonal multiple access basic transmission unit includes one or more OFDM symbols as a basic unit. A frequency-domain resource corresponding to the non-orthogonal multiple access basic transmission unit includes a group of frequency-domain subcarriers as a basic unit, and the number of subcarriers included in the group of frequency-domain subcarriers is an integral multiple of the number of rows of a non-orthogonal multiple access pattern matrix. The pattern vector resource corresponding to the non-orthogonal multiple access basic transmission unit includes one column of the non-orthogonal multiple access pattern matrix as a basic unit. The pilot resource corresponding to the non-orthogonal multiple access basic transmission unit includes one of a group of orthogonal pilot signal sets as a basic unit.

In a possible embodiment of the present disclosure, with respect to the mapping relationship between the UEs and the non-orthogonal multiple access basic transmission units, the UE away from the network side device has an NLOS feature more obvious than the UE adjacent to the network side device.

In a possible embodiment of the present disclosure, the step of determining, by the UE, the allocated non-orthogonal multiple access basic transmission unit includes: receiving, by the UE, the corresponding non-orthogonal multiple access basic transmission unit notified by the network side device; or determining, by the UE, the allocated non-orthogonal multiple access basic transmission unit in accordance with UE information, the UE information about different UEs having different values.

In a possible embodiment of the present disclosure, subsequent to the step of transmitting, by the UE, the pilot signal and the data simultaneously on the corresponding non-orthogonal multiple access basic transmission unit to the network side device, the data transmission method further includes, after the network side device has notified the UE through downlink signaling that there is a multi-user pilot signal conflict, transmitting, by the UE, the pilot signal and the data on the corresponding non-orthogonal multiple access basic transmission unit within a subframe delayed by N subframes in the case that there exists the data transmission, where N is a positive integer.

The present disclosure will be described hereinafter in more details by taking the PDMA technology as an example.

In some embodiments of the present disclosure, the above-mentioned first scheme may be adopted for a mapping rule between the UEs and the PDMA basic transmission units. The mapping relationship between the UEs and the PDMA basic transmission units may be established in a one-to-one correspondence manner using a PL reported by the UE during the random access procedure. The above-mentioned Mode 2 for conflict treatment may be adopted.

Step 1: the base station and the UEs may predefine uplink grant-free parameters. The uplink grant-free parameters may include, but not limited to, parts or all of the followings: firstly, a system bandwidth of 20 MHz; secondly a ratio of grant-free time-frequency resources to granted time-frequency resources, e.g., 0.8:0.2; thirdly a data format for uplink grant-free transmission (which has a source bit length of 30 bytes and an encoding modulation mode of QPSK and ½); fourthly an uplink grant-free PDMA basic transmission unit which uses a PDMA pattern matrix of [3,7]; and fifthly a mapping rule between the UEs and the PDMA basic transmission units (i.e., a mapping scheme 1 where the base station has already allocated the corresponding PDMA basic transmission unit to each UE in the case that the UE has accessed to the base station).

Figure 2:
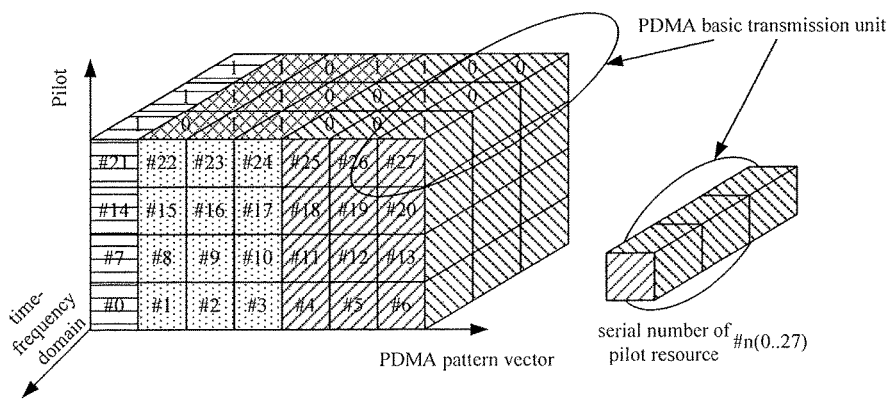
FIG. 2 is a schematic view showing a non-orthogonal multiple access basic transmission unit according to one embodiment of the present disclosure.

FIG. 2 shows the uplink grant-free PDMA basic transmission units.

FIG. 2 shows 28 candidate PDMA basic transmission units in an identical group of time-frequency resources. The allocation of the pilot resources and the PDMA pattern vector resources will be described hereinafter. 0 to 6 correspond to an identical pilot resource and different PDMA pattern vectors; 7 to 13 correspond to another identical pilot resource and different PDMA pattern vectors; 0, 7, 14 and 21 correspond to an identical PDMA pattern vector and different pilot resources; 1, 8, 15 and 22 correspond to another identical PDMA pattern vector and different pilot resources, and so on.

The PDMA pattern vector 【3,7】 includes 3 rows, so the data in each row may be mapped to consecutive time-frequency units, or to inconsecutive time-frequency units respectively. As shown in the formula $$B_{PDMA,3\times 7} = \begin{bmatrix} 1 & 1 & 0 & 1 & 1 & 0 & 0 \\ 1 & 1 & 1 & 0 & 0 & 1 & 0 \\ 1 & 0 & 1 & 1 & 0 & 0 & 1 \end{bmatrix}, \quad (1)$$

each group of time-frequency resources includes three consecutive time-frequency resources, the number of the PDMA pattern vectors is 7, and each PDMA pattern vector corresponds to 4 different pilot signals.

The pattern matrix includes the pattern vectors having three different diversities, and the pattern vectors having the diversities of 3, 2 and 1 correspond to the first column, the second to fourth columns, and the fifth to seventh columns respectively. Hence, the pattern matrix may be divided into three groups of pattern vectors, and the number of the pattern vectors in these groups may be $C_3^3=1$ $C_3^2=3$ $C_3^1=3$ respectively.

Step 2: each UE may initiate a random access request to the base station using a known LTE random access procedure, so as to access to the base station successfully.

Step 3: the base station may establish the mapping relationship between the UEs and the PDMA basic transmission units in a one-to-one correspondence manner using the PL reported during the random access procedure as a channel environment parameter, and notify the mapping relationship to each UE.

Figure 3:
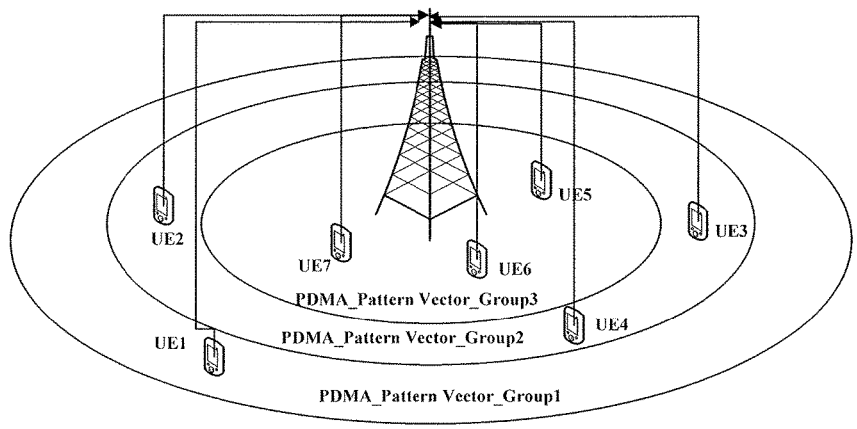
FIG. 3 is a schematic view showing a mapping relationship between UEs and the non-orthogonal multiple access basic transmission units according to one embodiment of the present disclosure.

As shown in FIG. 3, PL values of seven users meet the following relationship: the PL value of user 1>the PL values of users 2/3/4>the PL values of users 5/6/7. The users having a large PL value may be allocated to the group of pattern vectors having a high diversity, while the users having a small PL value may be allocated to the group of pattern vectors having a low diversity. To be specific, user 1 may occupy a column having a diversity of 3 in the PDMA pattern matrix 【3,7】, users 2/3/4 may occupy a column having a diversity of 2 in the PDMA pattern matrix 【3,7】, and users 5/6/7 may occupy a column having a diversity of 1 in the PDMA pattern matrix 【3,7】.

Step 4: each UE may acquire the mapping relationship between the UE and the PDMA basic transmission unit from the base station, and in the case that the data is to be transmitted, transmit the data and the pilot signal simultaneously on the allocated PDMA basic transmission unit. The data needs to be transmitted strictly in accordance with the data format for uplink grant-free transmission.

Step 5: the base station may monitor in real time the pilot signals from all the candidate UEs on each PDMA basic transmission unit, determine whether or not data is transmitted from each candidate UE, and perform the data detection on the UE which has transmitted the data.

Step 6: the base station may determine whether or not there exists a multiuser pilot signal conflict, and in the case that there exists the multiuser pilot signal conflict, perform the treatment in accordance with the above-mentioned Mode 2 for conflict treatment. In other words, the base station may notify through the downlink signaling the UE that there exists the multiuser pilot signal conflict. The UE may then generate a random value of N, and transmit the pilot signal and the data on the corresponding PDMA basic transmission unit within a subframe delayed by N subframes (i.e., backoff time) each time in the case that the data is to be transmitted.

In some embodiments of the present disclosure, the above-mentioned second scheme may be adopted for a mapping rule between the UEs and the PDMA basic transmission units, and the above-mentioned Mode 1 for conflict treatment may be adopted for the conflict treatment.

Step 1: the base station and the UEs may predefine uplink grant-free parameters. The uplink grant-free parameters may include, but not limited to, parts or all of the followings: firstly a system bandwidth of 20 MHz; secondly a ratio of grant-free time-frequency resources to granted time-frequency resources, e.g., 0.8:0.2; thirdly a data format for uplink grant-free transmission (which has a source bit length of 30 bytes and an encoding modulation mode of QPSK and ½); fourthly an uplink grant-free PDMA basic transmission unit which uses a PDMA pattern matrix of 【3,7】; and fifthly a mapping rule between the UEs and the PDMA basic transmission units (i.e., a mapping scheme 2 where each UE may be mapped to the corresponding non-orthogonal multiple access basic transmission unit using a certain rule in accordance with its own user feature (e.g., physical ID)).

FIG. 2 shows the uplink grant-free PDMA basic transmission units.

FIG. 2 shows 28 candidate PDMA basic transmission units in an identical group of time-frequency resources. The allocation of the pilot resources and the PDMA pattern vector resources will be described hereinafter. 0 to 6 correspond to an identical pilot resource and different PDMA pattern vectors; 7 to 13 correspond to another identical pilot resource and different PDMA pattern vectors; 0, 7, 14 and 21 correspond to an identical PDMA pattern vector and different pilot resources; 1, 8, 15 and 22 correspond to another identical PDMA pattern vector and different pilot resources, and so on.

The PDMA pattern vector 【3,7】 includes 3 rows, so the data in each row may be mapped to consecutive time-frequency units, or to inconsecutive time-frequency units respectively. As shown in the formula $$B_{PDMA,3\times 7} = \begin{bmatrix} 1 & 1 & 0 & 1 & 1 & 0 & 0 \\ 1 & 1 & 1 & 0 & 0 & 1 & 0 \\ 1 & 0 & 1 & 1 & 0 & 0 & 1 \end{bmatrix}, \quad (1)$$

each group of time-frequency resources includes three consecutive time-frequency resources, the number of the PDMA pattern vectors is 7, and each PDMA pattern vector corresponds to 4 different pilot signals.

The pattern matrix includes the pattern vectors having three different diversities, and the pattern vectors having the diversities of 3, 2 and 1 correspond to the first column, the second to fourth columns, and the fifth to seventh columns respectively. Hence, the pattern matrix may be divided into three groups of pattern vectors, and the number of the pattern vectors in these groups may be $C_3^3=1$ $C_3^2=3$ $C_3^1=3$ respectively.

Step 2: each UE may initiate a random access request to the base station using a known LTE random access procedure, so as to access to the base station successfully.

Step 3: in the case that each UE has accessed to the base station, the base station may not allocate an explicit PDMA basic transmission unit to the UE.

Each UE may be mapped to the corresponding PDMA basic transmission unit using a certain rule in accordance with its own user feature (e.g., physical ID) through a modulo operation, i.e., a serial number of the PDMA basic transmission unit=the physical ID of the UE mod the total number of the PDMA basic transmission units.

Each UE may transmit all the uplink data and the pilot signals subsequently on the resources corresponding to the serial number of the PDMA basic transmission unit, e.g., the time-frequency resources and the PDMA pattern vectors.

Step 4: each UE may acquire the mapping relationship between the UE and the PDMA basic transmission unit from the base station, and in the case that the data is to be transmitted, transmit the data and the pilot signal simultaneously on the allocated PDMA basic transmission unit. The data needs to be transmitted strictly in accordance with the data format for uplink grant-free transmission.

Step 5: the base station may monitor in real time the pilot signals from all the candidate UEs on each PDMA basic transmission unit, determine whether or not data is transmitted from each candidate UE, and perform the data detection on the UE which has transmitted the data.

Step 6: the base station may determine whether or not there exists a multiuser pilot signal conflict, and in the case that there exists the multiuser pilot signal conflict, perform the treatment in accordance with the above-mentioned Mode 1 for conflict treatment. In other words, the base station may determine whether or not the time interval for the reception of uplink data from the UE is greater than a threshold, and in the case that the time interval is greater than the threshold, the base station may determine that there is the pilot signal conflict between the UE and the other UEs. At this time, the base station may schedule the UE to transmit the data on the reserved granted time-frequency resource, and notify through the downlink signaling the new PDMA basic transmission unit to the UE.

According to the embodiments of the present disclosure, the network side device determines the mapping relationship between the UEs and the PDMA basic transmission units, and each PDMA basic transmission unit corresponds to the time-frequency resource, the pattern vector resource and the pilot resource. Next, the network side device detects the pilot signal from each UE on the non-orthogonal multiple access basic transmission unit corresponding to the UE, and in the case that the pilot signal has been detected, performs the data detection on the UE, which has transmitted the pilot signal, through the non-orthogonal multiple access basic transmission unit. Because the network side device detects the pilot signal from the UE on the non-orthogonal multiple access basic transmission unit corresponding to the UE, it is able to transmit the data without scheduling the resources for the UE, thereby to meet the requirements on an application scenario where a large number of UEs have been connected to the network side device, and reduce the control signaling overhead.

The present disclosure has been described with reference to the flow charts and/or block diagrams of the method, device (system) and computer program product according to the embodiments of the present disclosure. It should be understood that computer program instructions may be used to implement each of the work flows and/or blocks in the flow charts and/or the block diagrams, and the combination of the work flows and/or blocks in the flow charts and/or the block diagrams. These computer program instructions may be provided to a processor of a common computer, a dedicate computer, an embedded processor or any other programmable data processing devices to create a machine, so that instructions executable by the processor of the computer or the other programmable data processing devices may create a device to achieve the functions assigned in one or more work flows in the flow chart and/or one or more blocks in the block diagram.

These computer program instructions may also be stored in a computer readable storage that may guide the computer or the other programmable data process devices to function in a certain way, so that the instructions stored in the computer readable storage may create a product including an instruction unit which achieves the functions assigned in one or more flows in the flow chart and/or one or more blocks in the block diagram.

These computer program instructions may also be loaded in the computer or the other programmable data process devices, so that a series of operation steps are executed on the computer or the other programmable devices to create processes achieved by the computer. Therefore, the instructions executed in the computer or the other programmable devices provide the steps for achieving the function assigned in one or more flows in the flow chart and/or one or more blocks in the block diagram.

The above are merely the preferred embodiments of the present disclosure, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A data transmission method used in a telecommunications system comprising a network side device and User Equipments (UEs), the method comprising:
   determining, by the network side device, non-orthogonal multiple access basic transmission units allocated to the UEs, each non-orthogonal multiple access basic transmission unit corresponding to a time-frequency resource, a pattern vector resource and a pilot resource, wherein the pattern vector resource corresponding to the non-orthogonal multiple access basic transmission unit comprises one column of a non-orthogonal multiple access (NOMA) pattern matrix as a basic unit;
   detecting, by the network side device, a pilot signal from each UE on the non-orthogonal multiple access basic transmission unit corresponding to the UE; and
   in the case that the pilot signal has been detected, performing, by the network side device, data detection on the UE, which has transmitted the pilot signal, through the non-orthogonal multiple access basic transmission unit,
   wherein the step of determining, by the network side device, the non-orthogonal multiple access basic transmission units allocated to the UEs comprises: allocating, by the network side device, the non-orthogonal multiple access basic transmission units with pattern vectors having different diversities to the UEs in the NOMA pattern matrix in accordance with distances between the UEs and the network side device;

wherein the non-orthogonal multiple access basic transmission unit with a pattern vector having a high diversity is allocated by the network side device to the UE at a large distance from the network side device; and wherein the diversity refers to the number of elements whose values are one appeared in a Pattern Division Multiple Access (PDMA) pattern vector in the NOMA pattern matrix.

2. The data transmission method according to claim 1, wherein a time-domain resource corresponding to the non-orthogonal multiple access basic transmission unit comprises one or more Orthogonal Frequency Division Multiplexing (OFDM) symbols as a basic unit;

a frequency-domain resource corresponding to the non-orthogonal multiple access basic transmission unit comprises a group of frequency-domain subcarriers as a basic unit, and the number of subcarriers comprised in the group of frequency-domain subcarriers is an integral multiple of the number of rows of the non-orthogonal multiple access (NOMA) pattern matrix; and the pilot resource corresponding to the non-orthogonal multiple access basic transmission unit comprises one of a group of orthogonal pilot signal sets as a basic unit.

3. The data transmission method according to claim 1, wherein the step of determining, by the network side device, the non-orthogonal multiple access basic transmission units allocated to the UEs comprises:

determining, by the network side device, the non-orthogonal multiple access basic transmission units allocated to the UEs in accordance with UE information, the UE information about different UEs having different values.

4. The data transmission method according to claim 1, wherein after the network side device has detected the pilot signal from each UE of a plurality of UEs on the non-orthogonal multiple access basic transmission unit corresponding to the UE of the plurality of UEs, the data transmission method further comprises:

in the case that there is a pilot signal conflict between the UE and the other UEs of the plurality of UEs, scheduling, by the network side device, the UE to perform the data transmission on a reserved scheduling time-frequency resource, and notifying, through downlink signaling, a previously presented non-orthogonal multiple access basic transmission unit allocated to the UE; or in the case that there is the pilot signal conflict between the UE and the other UEs of the plurality of UEs, notifying, by the network side device, the UE that there is a multi-user pilot signal conflict through downlink signaling.

5. The data transmission method according to claim 1, wherein after the network side device has detected the pilot signal, the data transmission method further comprises performing, by the network side device, pilot channel estimation on the UE that has transmitted the pilot signal through the non-orthogonal multiple access basic transmission unit.

6. A network side device used in a telecommunications system comprising the network side device and User Equipments (UEs), the network side device comprising a processor, a transceiver and a memory, wherein the processor is configured to read a program stored in the memory, so as to: determine non-orthogonal multiple access basic transmission units allocated to the UEs, each non-orthogonal multiple access basic transmission unit corresponding to a time-frequency resource, a pattern vector resource and a pilot resource, wherein the pattern vector resource corresponding to the non-orthogonal multiple access basic transmission unit comprises one column of a non-orthogonal multiple access (NOMA) pattern matrix as a basic unit; detect a pilot signal from each UE on the non-orthogonal multiple access basic transmission unit corresponding to the UE; and in the case that the pilot signal has been detected, perform data detection on the UE, which has transmitted the pilot signal, through the non-orthogonal multiple access basic transmission unit, the transceiver is configured to receive and transmit data, and the memory is configured to store therein data for the operation of the processor, wherein the processor is further configured to: allocate the non-orthogonal multiple access basic transmission units with pattern vectors having different diversities to the UEs in the NOMA pattern matrix in accordance with distances between the UEs and the network side device;

wherein the non-orthogonal multiple access basic transmission unit with a pattern vector having a high diversity is allocated by the network side device to the UE at a large distance from the network side device; and wherein the diversity refers to the number of elements whose values are one appeared in a Pattern Division Multiple Access (PDMA) pattern vector in the NOMA pattern matrix.

7. The network side device according to claim 6, wherein a time-domain resource corresponding to the non-orthogonal multiple access basic transmission unit comprises one or more Orthogonal Frequency Division Multiplexing (OFDM) symbols as a basic unit;

a frequency-domain resource corresponding to the non-orthogonal multiple access basic transmission unit comprises a group of frequency-domain subcarriers as a basic unit, and the number of subcarriers comprised in the group of frequency-domain subcarriers is an integral multiple of the number of rows of the non-orthogonal multiple access (NOMA) pattern matrix; and the pilot resource corresponding to the non-orthogonal multiple access basic transmission unit comprises one of a group of orthogonal pilot signal sets as a basic unit.

8. The network side device according to claim 6, wherein the network side device is further configured to:

determine the non-orthogonal multiple access basic transmission units allocated to the UEs in accordance with UE information, the UE information about different UEs having different values.

9. The network side device according to claim 6, wherein the network side device is further configured to:

in the case that there is a pilot signal conflict between the UE and the other UEs of the plurality of UEs, schedule the UE to perform the data transmission on a reserved scheduling time-frequency resource, and notify, through downlink signaling, the UE to be mapped to a previously presented non-orthogonal multiple access basic transmission unit; or in the case that there is a pilot signal conflict between the UE and the other UEs of the plurality of UEs, notify the UE that there is a multi-user pilot signal conflict through downlink signaling, wherein the network side device is further configured to, after the network side device has detected the pilot signal, perform pilot channel estimation on the UE that has transmitted the pilot signal through the non-orthogonal multiple access basic transmission unit.

* * * * *